United States Patent [19]
Madsen et al.

[11] Patent Number: 5,398,600
[45] Date of Patent: Mar. 21, 1995

[54] BATCH CONVEYOR FOR PROCESSING CHAMBER

[76] Inventors: Torben Madsen, 63 Waterford Drive, Weston, Ontario, Canada, M9R 2N7; Bjarne N. Jensen, 29 Horton Crescent, Brampton, Ontario, Canada, L6S 5J3

[21] Appl. No.: 15,442

[22] Filed: Feb. 9, 1993

[51] Int. Cl.[6] ............................................. A23B 4/044
[52] U.S. Cl. ..................... 99/477; 99/443 C; 99/362; 198/772
[58] Field of Search ................. 99/477, 361, 360, 364, 99/367, 371, 468, 482, 362, 443 C; 198/721, 738, 747, 772

[56] References Cited

U.S. PATENT DOCUMENTS

| | | | |
|---|---|---|---|
| 1,328,397 | 1/1920 | Rea et al. | 99/477 |
| 1,454,422 | 5/1923 | Abe | 99/477 |
| 1,534,867 | 4/1925 | Peschke et al. | 99/477 |
| 1,715,625 | 6/1929 | Rind | 99/477 |
| 3,122,243 | 2/1964 | Hawley | 99/443 C |
| 4,282,970 | 8/1981 | Smock | 198/772 |
| 4,610,886 | 9/1986 | Buller-Colthurst | 99/477 |
| 4,644,857 | 2/1987 | Buller-Colthurst | 99/443 C |
| 4,717,572 | 1/1988 | Buller-Colthurst | 99/443 C |
| 5,195,630 | 3/1993 | Donovan et al. | 198/772 |
| 5,203,256 | 4/1993 | Mueller | 99/477 |

FOREIGN PATENT DOCUMENTS

| | | | |
|---|---|---|---|
| 1017896 | 10/1957 | Germany | 99/477 |
| 0047387 | 7/1939 | Netherlands | 99/477 |
| 0153977 | 4/1956 | Sweden | 99/477 |

*Primary Examiner*—David A. Scherbel
*Assistant Examiner*—James F. Hook

[57] ABSTRACT

A processing apparatus having a chamber having upstream and downstream ends for processing a plurality of products in batches, each batch of product being supported on a carrier having sides, a bottom and a top. The carriers being capable of being transitted through the chamber one after the other, side supports on opposite sides of the chamber spaced apart a distance sufficient to receive the carriers upon which the carriers are supported, while standing in and being moved through the chamber and the side supports being set at an incline from a low point adjacent the upstream end to a high point adjacent the downstream end, and a power device for causing movement of the carriers from the upstream end to the downstream end, stops engageable by the carriers, for preventing reverse movement of the carriers down the incline towards the upstream end, doors separating the chamber into zones, and power operated devices for moving the doors, and a controller for sensing the positions of some of the carriers, and opening and closing the doors when required.

12 Claims, 6 Drawing Sheets

BATCH CONVEYOR FOR PROCESSING CHAMBER

FIELD OF THE INVENTION

The invention relates to a conveyor system for conveying batches of product through a processing chamber and in particular to such a conveyor which has a support mounted on the floor of the chamber, and which provides separate movement means for intermittent movement of the product through, and dwells of product in the chamber.

BACKGROUND OF THE INVENTION

In the processing of a wide variety of different products, and in particular in the processing of meat products as by cooking, smoking, chilling and the like, it is the practise to process the products in one or more processing chambers and to convey the products from one chamber, or through chambers divided into a series of different chamber zones. As the products dwell in the different chambers or zones, the atmosphere and the conditions within each chamber will be such as to produce a pre-determined processing action on the product, whether it be cooking, smoking, chilling, or any other process.

In order to produce a satisfactory end product and to produce uniformity and minimize wastage, it is necessary that the conditions throughout each chamber, or zone of the chamber system, shall be uniform from top to bottom and side to side. It is also necessary that the products dwelling within the chamber shall be supported or stored in such a manner that the atmosphere within the chamber can have full access to all of the products, both in the top and the bottom of the chamber and on both sides, to the fullest and extent.

In some processing systems, that the products are supported on a conveyor system which provides for continuous movement from zone to zone, so that the products are always moving through the zones during processing. However, such oven processing facilities occupy a substantial amount of floor area, and are somewhat costly to build.

In many cases therefore, it is desirable to process such products in batches. Such a batch of product would be typically be stored on a single storage device in the form of a rectangular cage-like device, open at the sides and the top and the bottom, and having shelves which are also of substantially open construction, so that the atmosphere within the zone can circulate throughout and around the products supported within the cage. However, the cage itself will remain essentially stationary during a pre-determined dwell time within a chamber zone or at a point in a chamber zone. Such systems have the advantage that they occupy less floor area and are more economical to build.

The processing conditions within any one zone of the chamber will of course be uniform, within that zone, or chamber. It will be appreciated that in some systems two or three or more separate chambers are provided, with the conveyor system running between them to carry the supported batches of product. In other systems, however, the chamber apparatus essentially is a continuous elongated rectangular chamber, and the interior is divided into separate chamber zones.

In the past, attempts have been made to provide such zone separations simply by air curtain type of barriers, but these have not been totally satisfactory. In fact, it is found greatly preferable to use actual doors between each of the zones, so as to as far as possible maintain a complete break between the condition of one zone and the condition of the next adjacent zone.

One of the problems in the design of an effective door system for separating the chambers or zones within a chamber, is that it is necessary to provide some activating means for opening and closing the doors. Usually, doors of this type are hinged along either side of the chamber, and swing from the centre of the chamber outwardly towards either side. It is found necessary to provide some form of means for opening the doors to permit a cage to pass therebetween, and to close the doors together again once the cage has passed. It might appear that all that is required is to provide a spring-loaded action on the door hinge of each of the doors, so that each door could simply swing open in response to movement of the cage, and swing closed once the cage had passed. However, industry standards for this type of equipment require that the cage shall be capable of passing through the doors without contact with the doors, and this standard therefore precludes this relatively simple solution.

In the past overhead conveyor rails have been provided, and at first sight such an overhead conveyor system does appear to offer advantages.

The conveyor system can readily be extended from either end of the chamber and continued to other areas of the processing facility for, for example, cutting, packaging and the like. However, in practise it has been found that there are certain disadvantages inherent in overhead conveyor systems for this type of processing facility. In particular, the interior of the chamber, and all accessories used within the chamber must be maintained totally clean and sterile. This may become difficult, particularly where an overhead conveyor system is used for carrying batches of product throughout other portions of the plant, where the conveyor system may become contaminated by grease, dirt and the like, which must then be cleaned off before the conveyor returns to the actual processing chamber. Lubrication of such overhead conveyors, if they have to pass through hot ovens, and through low temperature chilling rooms, also presents problems.

Clearly therefore it is advantageous to provide a conveyor system for use in such processing chamber facilities, which conveyor system is readily and easily accessible for a thorough cleansing operation, at regular intervals, so that dirt and contamination from other parts of the plant does not accumulate in the chamber.

It is particularly advantageous, if a conveyor system can be provided for conveying the cages through the processing chambers, which conveyor system terminates at or near to the entrance and exit points of the chamber, with other alternate conveyor means being provided running throughout the rest of the plant to and from those entrance and exit points. In this way any dirt or contaminate material on the conveyor running throughout the rest of the plant, will be isolated at the entrance and exit of the chamber, and the cage will be transferred from the one plant conveyor system to the other (chamber) system for passage through the chamber. Other advantages are obtained by such a system.

However, if the design of the chamber system, a continuous overhead conveyor rail is used, then the side walls of the chamber itself must incorporate structural members of sufficient strength to support the overhead conveyor system. This design requirement may interfere in some respects with the design of the chamber and its air circulating facilities, and cause unnecessary expense. In addition, in overhead conveyor systems, some small allowance must be made on either side for swinging movement of the cages. Thus when such overhead conveyor systems are used in a processing chamber, the side walls of the chamber must be spaced far enough apart that allowance is made for this small degree of movement, and this too may cause cost increases in the construction of the chamber and in its operation, which it would be desirable to avoid or at least reduce as far as possible.

Proposals have been made, in this type of processing chamber, utilizing cages for supporting products as they move into and out of the chamber, to simply support the cage on a system of wheels located on the underneath of the cage and running on the floor of the chamber.

This system has certain advantages, since it does not employ an overhead conveyor with all of its complications.

However, it is not always easy to maintain totally sterile sanitary conditions on the floor of the chamber. The wheels may pick up some contamination either outside the chamber or as they pass through the chamber, and this is unacceptable.

BRIEF SUMMARY OF THE INVENTION

With a view to overcoming the various conflicting problems described above, the invention comprises a processing chamber apparatus having chamber means for processing a plurality of products in batches, each said batch of product being adapted to be supported on carriers defining sides, a bottom and a top, each said carriers being adapted to be transited through said chamber means one after the other, support means on opposite sides of said chamber means, to receive said carriers thereon, while standing in and being moved through said chamber means, said chamber means defining an upstream end and a downstream end, moveable bearing means on said carriers, and oriented for engagement with said support means of said chamber means, for supporting said carriers on said support means, and said support means defining a predetermined incline from a low point adjacent said upstream end to a high point adjacent said downstream end, movement means for causing movement of said carriers from said upstream end to said downstream end, and, buffer means engageable by said carriers, for preventing reverse movement of said carriers down said incline towards said upstream end.

The invention further provides a processing apparatus as described, and further incorporating door means separating at least one portion of said chamber means from another portion thereof, and means for opening said door means, whereby to permit passage of a said carrier therethrough, and means for closing said door means after passage of a said carrier therethrough.

The invention further comprises a processing facility of the type described and further incorporating an incremental movement means, for intermittently engaging said carriers, moving the same a pre-determined increment, and thereafter releasing same, whereby to procure intermittent step-wise movement thereof through said chamber means, and dwelling of said carriers between said incremental movements.

The invention further comprises a processing facility of the type described, and wherein the support means is supported above the floor portion of said chamber means, and wherein said movement means is supported from a roof portion of said chamber means.

The invention further comprises a processing facility of the type described wherein the bearing means on said carriers comprise wheels rotatably mounted on opposite sides of said carriers, and located to ride on said support means, while supporting said carriers above said floor portion.

The invention further comprises a processing facility of the type described and including sensing devices located at spaced located throughout said chamber means, and a central processing controller receiving information from said sensing means, and door operating control means in said controller, for operating said door means in timed relation to movement of said carriers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
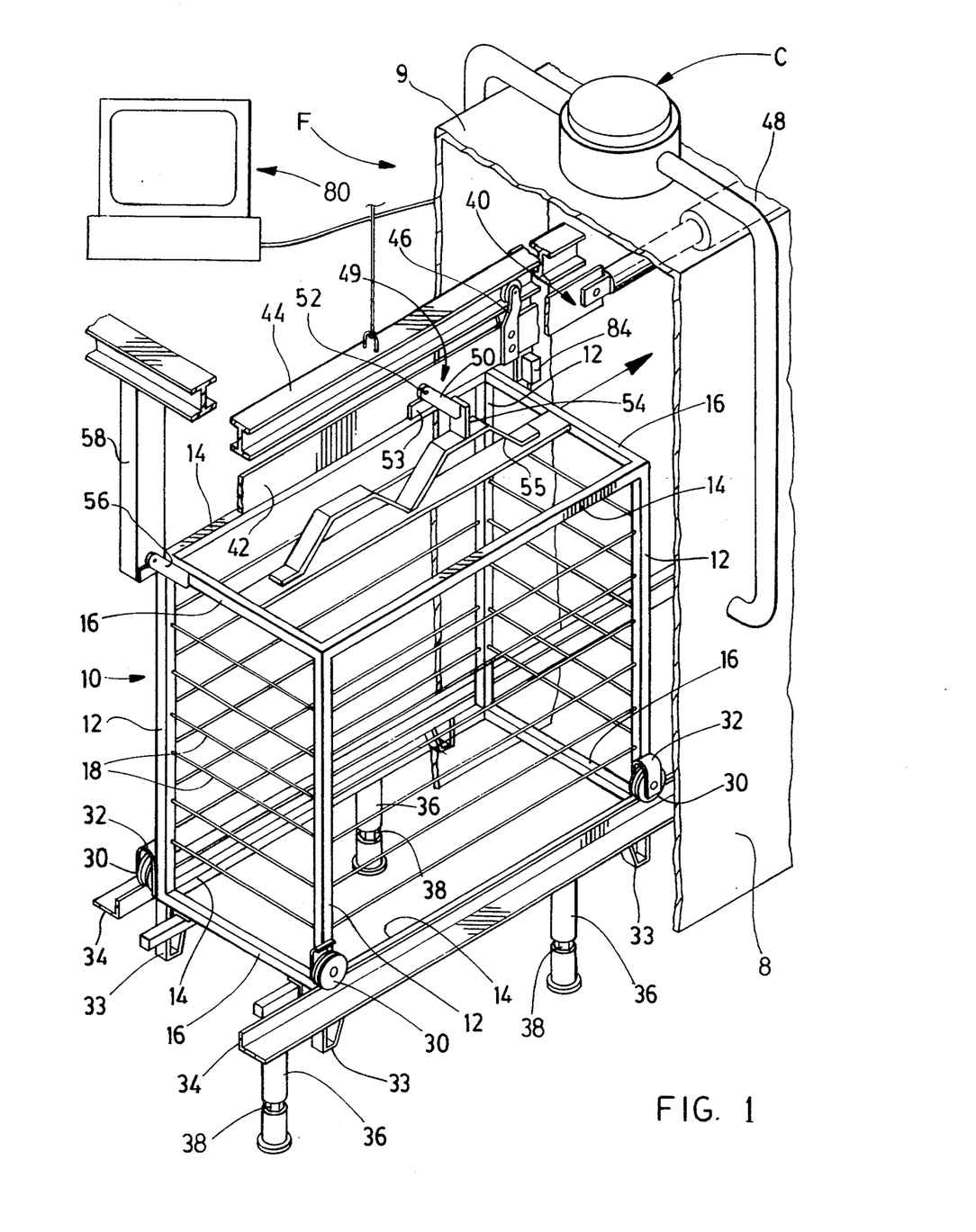
FIG. 1 is a perspective illustration of a typical processing chamber facility in accordance with the invention, showing the conveyor rail system in accordance with the invention in use therein.

Referring first of all to FIG. 1, it will be seen that the invention is there illustrated in the form of a processing chamber facility indicated generally as F, having process conditioning means indicated generally as C associated therewith. It will, of course, be appreciated that the facility F may be an elongated chamber, or may be two or three or more chambers arranged one after the other in sequence. The facility F may be designed to carry out a single process step, or to carry out a plurality of different processing steps to complete an overall process, on a product or batches of products. The details of such different processes or processing steps may vary widely from one product to another. In the particular case illustrated, the facility F is designed and intended for processing meat products, such as hams and the like. Such products are usually either cooked and chilled, or smoked and cooked and chilled, and may be smoked, and cooked, in a variety of different ways. The precise details of the processing steps, and the way in which they are carried out, forms no part of the present invention. The conditioning system C is shown merely by way of example as indicating one way of maintaining processing conditions in a chamber facility, or a portion or "zone" of that facility.

It will, of course, be appreciated that one of the basic factors in the design of such processing facilities is that the processing condition desired shall be capable of being maintained throughout the full extent of the length and breadth and height of the processing chamber or zone of a chamber, so that all products present in that chamber or part or zone of a chamber shall be processed under substantially identical conditions to produce a high-quality uniform end product with a minimum of wastage.

The processing conditions may be procured in a variety of ways. Thus, it may be by air circulation, which may be heated or chilled. Or by smoke circulation, with smoke being suitably generated in the conditioning means C.

Alternatively, the conditions may be procured by a water deluge, wherein high mass volumes of water are deluged down from the top of the chamber to the bottom, the water being heated, or chilled, depending upon the process to be carried out in that particular chamber, or zone of the chamber.

These various processing conditioning methods are described merely by way of generality, and without excluding any other processing conditioning means, all of which are deemed included herein by reference.

As mentioned above, in the past, some of such processes have been carried out in chambers of considerable length, in which it was necessary to maintain the desired processing conditions over a very substantial length of a chamber. In some such prior art systems, the chamber was in fact arranged in a series of parallel lengths or "runs" with the ends being joined, so as to form a more or less flattened zigzag or S-shape in plan, with a continuous conveyor system conveying product moving continuously through the chamber from one end to the other. Such chambers must be designed with great care and skill in order to ensure that processing conditions are maintained within the desired limits, throughout the length of the chamber.

In this type of system, with a continuously moving conveyor, the separation of the chamber into different zones was also a complex problem, since it was, generally speaking, impractical to use doors to separate one zone of the chamber from another.

It has, in fact, been found in many cases, to be preferable to provide a processing chamber having a width and height dimension much greater than prior art continuous chambers, and having a length considerably shorter, so that the chamber facility is located on a straight line axis. In this type of system, batches of product are arranged on carriers which are then placed in a region or zone of the chamber, and are simply left there for a predetermined length of time, herein called the "dwell" time, required to achieve the necessary processing result. After dwelling for a certain length of time, the carrier together with all the product on it, is then transported into the next portion of the chamber or zone, for further processing under the same, or different, conditions. This enables an increase in the cross sectional dimensions of the chamber to be achieved and this is found to facilitate the problem of maintaining precise processing conditions within any portion or zone of the chamber. At the same time, it increases the volume of product that can be processed within of the chamber. This in turn permits the overall length of the chamber to be greatly reduced. This in turn permits the design of the conveyor system to be greatly simplified.

The use of an intermittent movement conveyor, also permits the chamber to be divided up into separate zones by doors. This gives much greater control over the processing conditions within any one zone.

Alternatively, the separate chambers, which can be considered as separate zones of an overall chamber, can, again in the same way, be separated by doors.

In the form of the invention illustrated in FIG. 1, the processing chamber facility indicated by the reference F, and has walls 8 and a roof 9 defining a width and height dimension adequate to process batches of product on a sufficiently large scale for the purpose intended. Batches of product are carried for placement in the chamber facility F, on rectangular metal carriers or frames known as "cages" indicated generally as 10. In the embodiment of the invention as illustrated, a single cage 10 is designed to carry multiple pieces of meat products, which may weigh in total, in the region of 4000 pounds or so per cage.

It will, of course, be appreciated that these figures are given by way of example only and are not in any way limiting on the invention. The cages 10 are designed on the basis of a generally rectangular framework, consisting of four upright columns 12. Upper and lower lengthwise frame members 14 join the upper and lower ends of the columns 12. Transverse front and rear members 16 join the columns at their upper and lower ends at the front and rear of the cage.

In this way, a generally cube shaped framework is defined. Products are supported on shelves shown schematically as 18.

Figure 3:
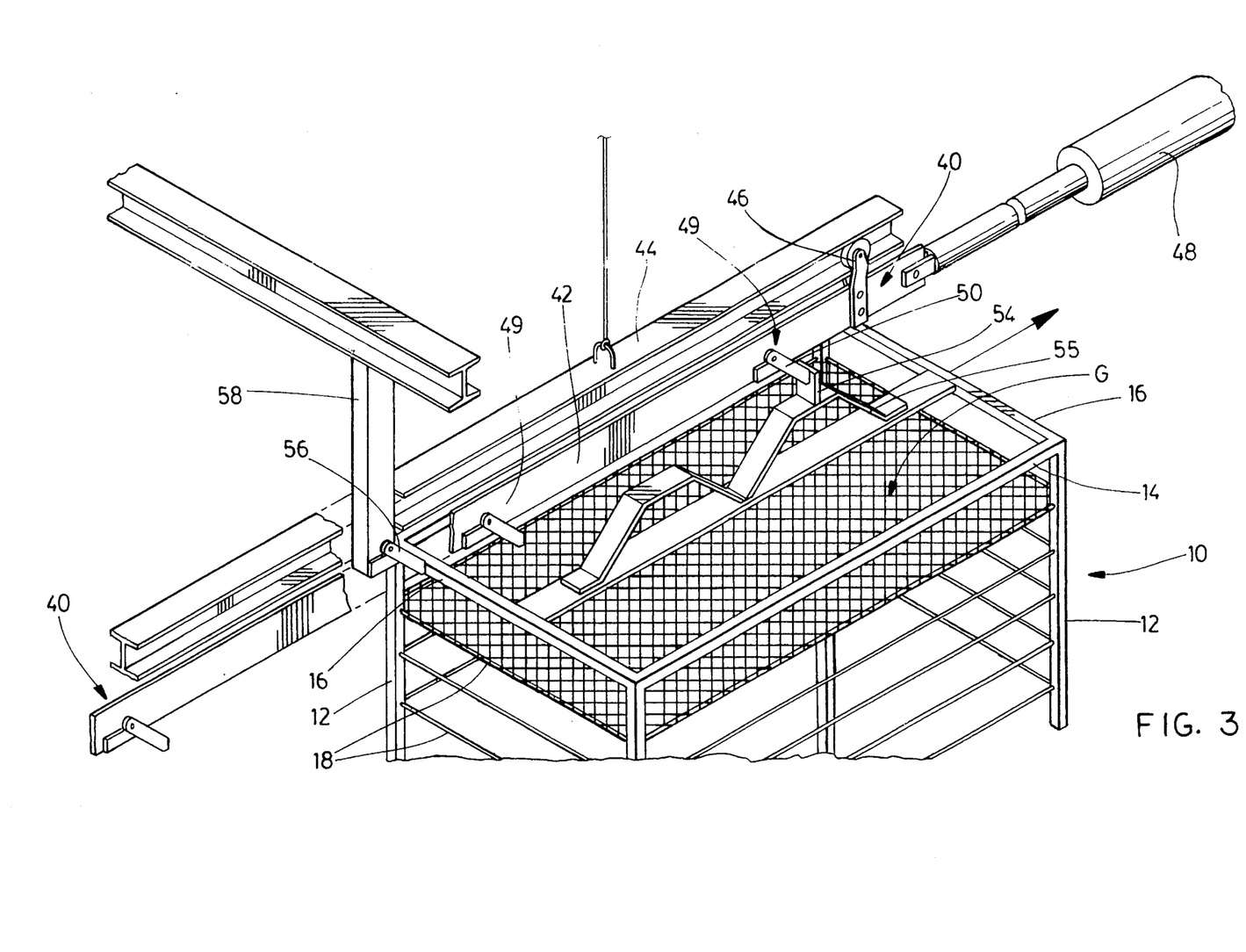
FIG. 3 is an upper rear perspective of a portion of the invention, partially cut away.

The details of the shelves are not illustrated in FIG. 1, but one such shelf is illustrated for the sake of example in FIG. 3. It will of course be appreciated that the design of the shelves may vary substantially from one facility to another, and may vary depending upon the type of product being processed. The shelves 18 are supported on the columns 12 at spaced intervals vertically one above the other. The spacing between the shelves may vary depending upon the type of product for which the processing facility is designed, and will allow adequate space for the positioning of the particular type of product on the shelf, without interfering with products above and below. Typically the shelves will be formed of cylindrical metal rod material or may be formed in the form of a generally rectangular wire mesh grille G, so as to give all round access to the surface of each product, so as to procure satisfactory uniform processing of each product.

As was mentioned above, the facility F may be designed to carry out a single processing stage, in which case the cages 10 will simply be placed in the chamber, from end to end of the chamber by any suitable means, and the chamber process conditioning means will then be operated to establish the processing conditions desired for the appropriate dwell time after which all of the cages of product would be removed. However, such relatively elementary processing is unusual. In the majority of cases processing will involve two or more different processing stages at different conditions. This can be achieved by the erection of entirely separate facilities F, in line with one another, so that the cages carrying the batches of product can be simply be moved from chamber to chamber.

Figure 4:
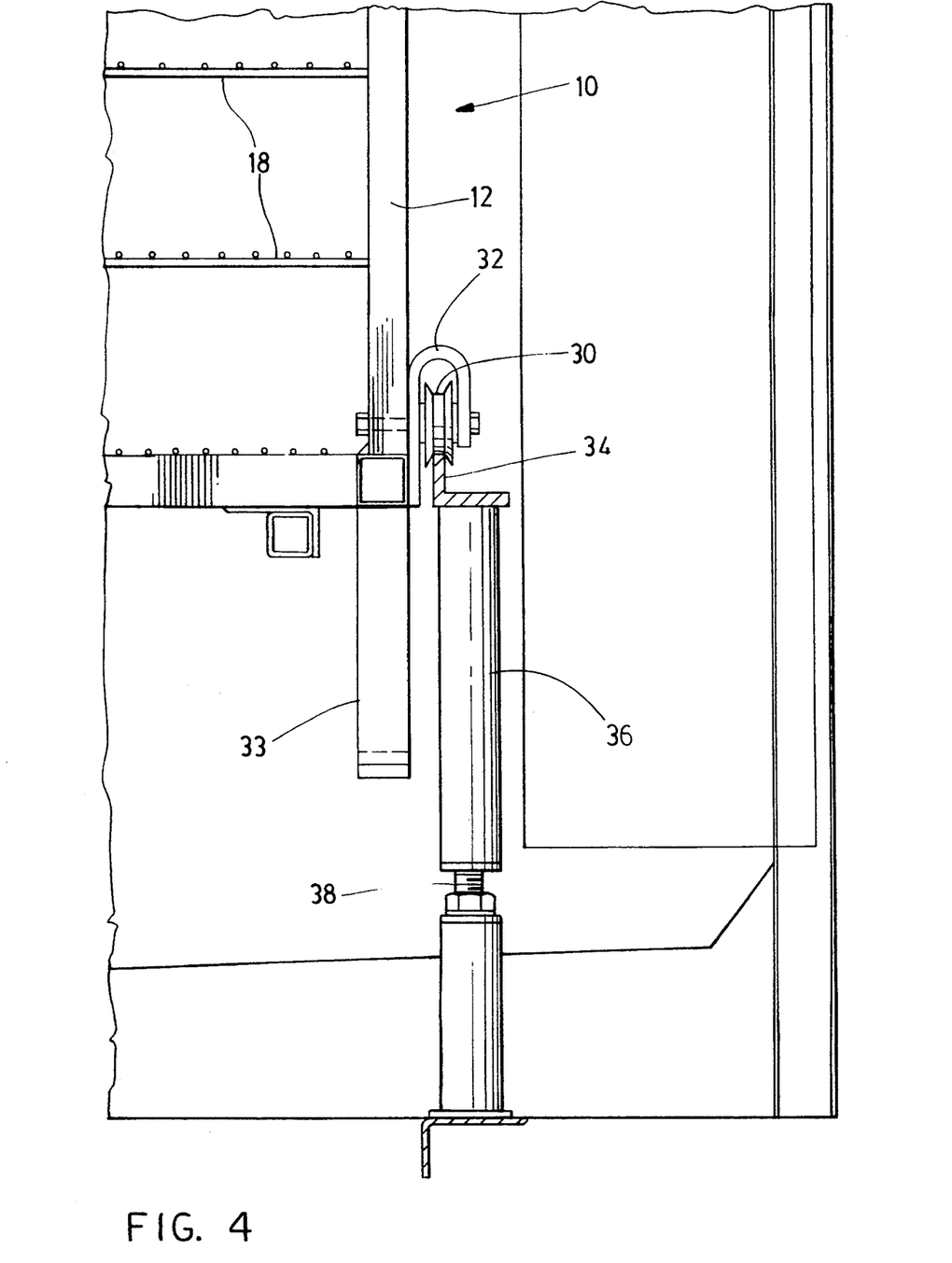
FIG. 4 is an end elevation of a portion of the apparatus of FIGS. 1 and 2.
Figure 5:
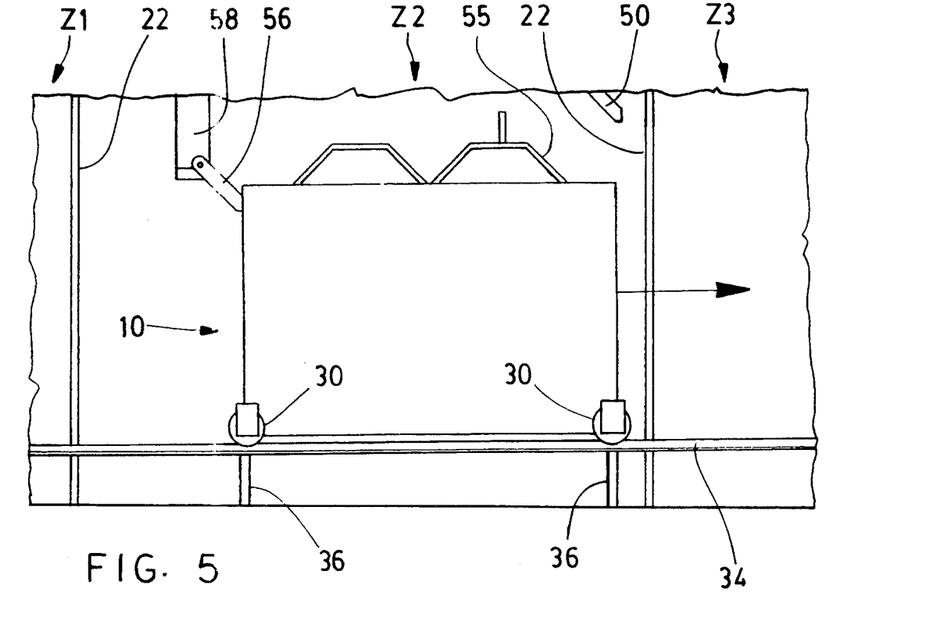
FIG. 5 is a partly schematic side elevation of the invention showing a cage and two sets of doors.
Figure 6:
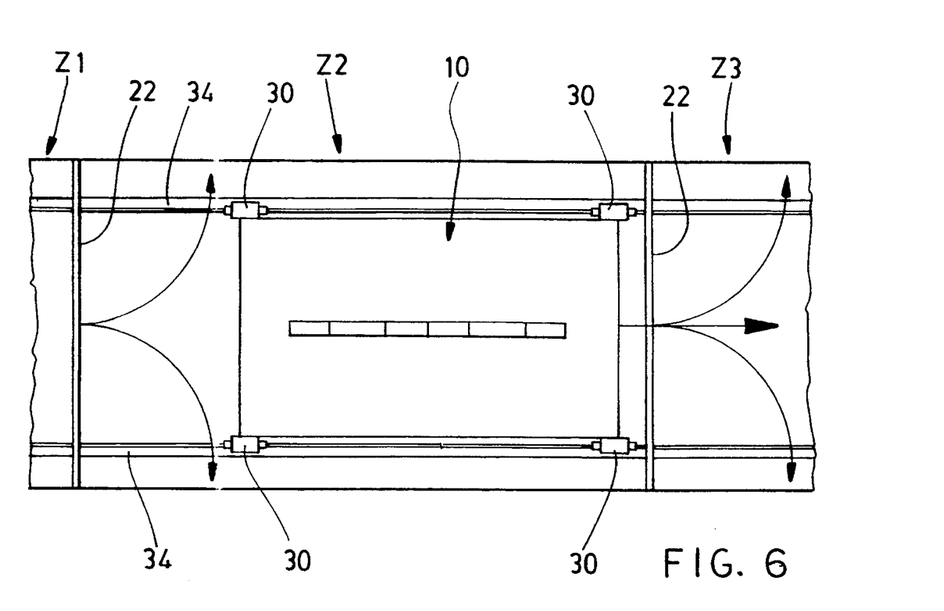
FIG. 6 is a schematic top plan view of the apparatus, corresponding to FIG. 5.
Figure 7:
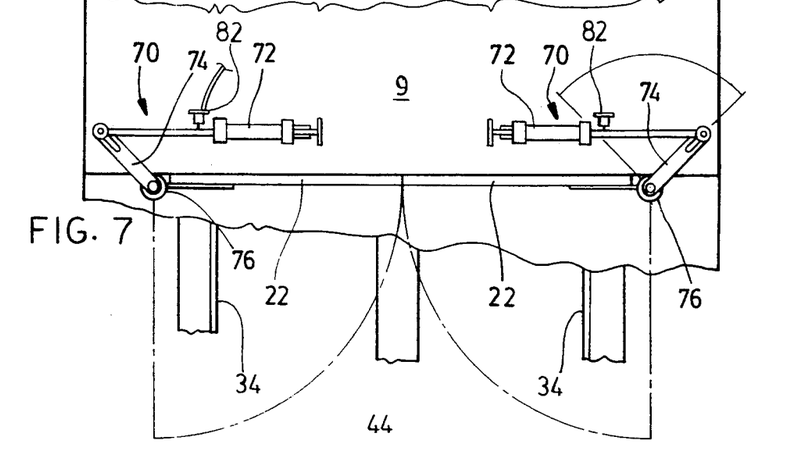
FIG. 7 is a top plan view of the door mechanisms for one pair of doors, used for separating the various zones of the apparatus, and, FIG. 8 is a front elevational view of the door mechanism of FIG. 6.
Figure 8:
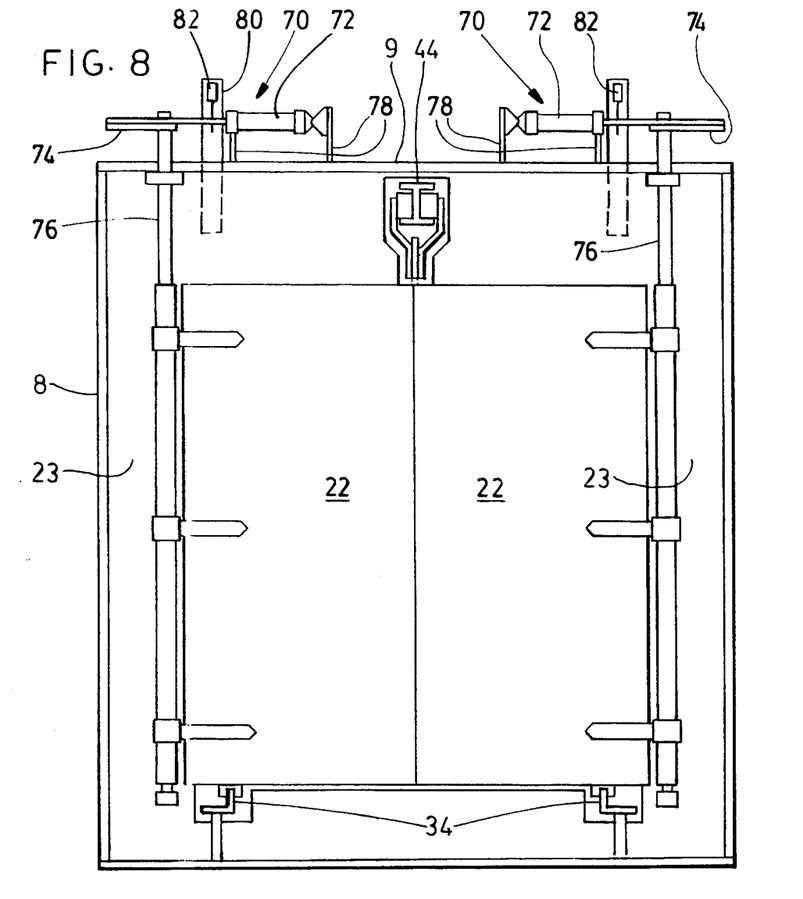

In the present embodiment of the invention however, the processing facility F will be seen to be divided up into, in this case, three processing zones indicated as Z1, Z2 and Z3 (FIGS. 4 and 5).

It will be appreciated that the indication of three processing zones is without limitations and is purely by way of example. It may be desirable to have four or five zones with for example the first two or three zones each being designed for cooking of the product, at progressively increasing temperatures, for example, followed by smoking and/or chilling.

While not specifically illustrated it will be understood that each of the zones Z1-Z2-Z3 would have its own process conditioning means indicated generally as C in FIG. 1, so as to maintain the processing conditions within each zone within a pre-set range.

The processing conditioning means may consist simply of air circulation means for obtaining predetermined temperature and humidity. Air may have smoke of various types added to it. The process conditioning means may also be for example steam, or in many cases simply a hot water deluge shower. Such process conditioning means are illustrated in other patents, and are merely represented here schematically by the reference C, it being understood that any one of a variety of such process conditioning means may be applicable to one or other of the zones Z1, Z2, or Z3, as is needed. The final zone in most cases will be a chilling zone, to bring the temperature of the product down, so that it is ready immediately for packaging and storage.

In order to maintain the zones Z1, Z2 and Z3 separate from one another, two pairs of doors 22—22 are secured on the transverse partitions 23 of the facility F, being located specifically between zones Z1 and Z2, and Z2 and Z3 respectively.

Further doors (not shown) are located at the upstream and downstream ends of the facility F, so as to maintain the facility closed during processing.

The doors may be opened and closed, in timed relation to the movement of the cages 10, in a manner described below. The cages 10 are provided with rail-type grooved wheels 30, being located towards the front and rear of each of the cages, in pairs.

Wheels 30 are carried in generally inverted U Shaped support frames 32, secured on either side of the cages. The cages also have legs 33, on which they may be stood on a floor. The wheels 30 are designed to run on a pair of side-by-side rails 34—34. Rails 34 are supported on any support eg. a floor or base indicated generally as B, by means of spaced apart columns 36—36. The columns 36 are provided with height adjustment means in the form of threaded couplings 38 (FIG. 4).

Figure 2:
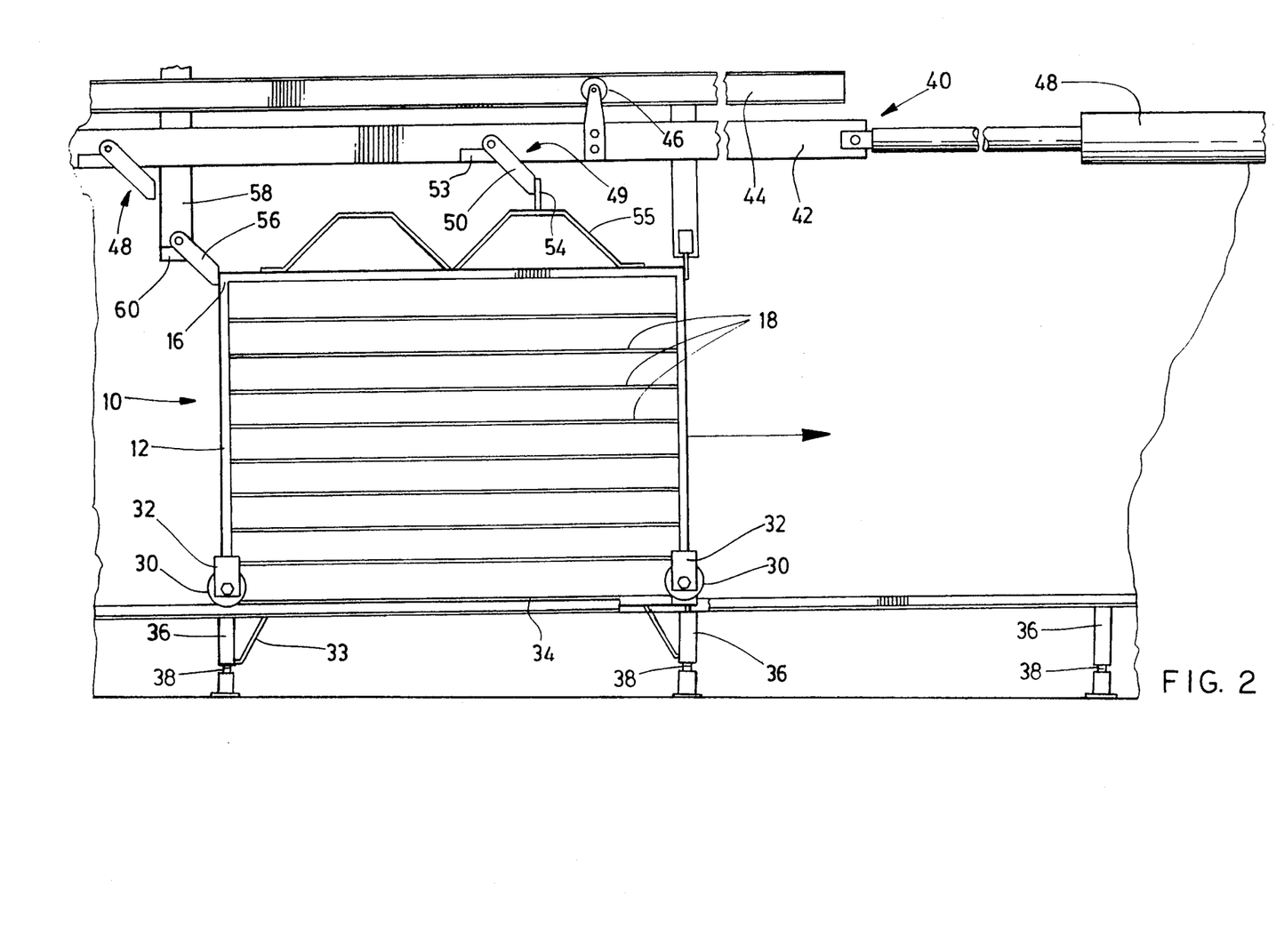
FIG. 2 is a side elevational view, partially shown in section, of a portion of the apparatus as shown in FIG. 1.

By means of such height adjustment means the rails are set at a pre-determined incline (FIG. 2) whereby they are somewhat lower at the upstream end of the chamber facility F, and somewhat higher at the downstream end. In this way, the cages are prevented from rolling uncontrollably downstream through the chamber F, and are in fact biased to roll in reverse, i.e. in an upstream, direction for reasons described below.

In this way, while the cages are being carried through the chamber zones on the rails, they will run freely on the wheels. They are elevated above the floor and are thus free of contamination from the floor in the chamber.

Similarly, when they are removed from the chamber, they may be stood on a floor, on the legs, until they are ready to be transported elsewhere.

In order to move the cages 10 along the rails, an overhead movement means indicated generally as 40 is provided. This movement means is in the form of what is referred to in the industry as a "walking beam" type of conveyor. It consists of an elongated beam 42, which is supported within the facility F so that it may be slid to and fro along the longitudinal axis of the facility F. The precise nature of the support may vary and in this case is shown as bar 44, and trolleys 46. However, since such support means are well known in the art they require no special description. On one or the other end of beam 42, a prime mover is provided typically in the form of a cylinder 48, which may be pneumatic, hydraulic, or the like. The operation of the cylinder will simply move the beam 42 to and fro longitudinally relative to bar 44.

At spaced intervals along the beam 42, a series of catch means 49 are provided. Typically, the catch means will be in the form of a weighted latch arms 50 pivotally mounted at spaced intervals, by pivots 52. Stop members 53 will hold the latch arms against rearward swinging, but will permit upward forward swinging movement of latch arms 50, so that they may simply lift up and drop, in a manner described below. Each of the cages 10 is provided with an abutment member 54, on an upper bracket 55. When the beam 42 is moved on the reverse stroke towards the upstream end of the conveyor, the latch arms 50 will simply swing up on contact with the abutments 54, and then drop down again. On the forward stroke of the beam 42, i.e. towards the downstream end of the facility F, the latch arms will engage the abutment members 54 on the cages, and move the cages a pre-determined increment along the rails 34. In this way, the cages will move along the rails in a start-stop intermittent fashion. Typically, they may be moved several times, by several increments of movement, within any one zone, before transitting from one zone to the next, through the respective pairs of doors separating the zones.

In order to control precisely the location of the cages when they are at rest in their respective zones, there are provided a plurality of buffer members 56, on fixed columns 58 secured in any suitable manner to the framework of the facility F. They are offset to one side of bar 44 and beam 42.

Buffer members 56 are located at spaced apart intervals therealong. The buffer members 56 are in the form of weighted latch arms similar to arms 50, which may simply swing up and drop again. The buffer members 56 will engage the rearward cross-frame members 16 of the cages 10, and provide a positive stop against rearward movement.

Upon forward i.e. downstream movement of the cages, the cross-frame members 16 are adapted to deflect buffer members 56 so that they simply lift up out of the way. However, once the cages have been moved the incremental distance by the movement means, i.e. the beam 42, and the beam 42 is then retracted once again, then the cages will roll back a short distance down the inclined rails 34, until the cross members 16 interengage with the buffers 56. In this way, each of the cages will come to rest at a pre-determined precise location.

It will be noted that the at rest positions of the cages (FIG. 2) corresponds with the registration of the wheels 30, with the posts 36 supporting the rails 34. In this way, at least during the time when the cages are standing still or dwelling in the chamber the weight of the cages and the product supported thereon will be supported directly on the posts 36, and will therefore not pose a continuous bending stress on the rails themselves.

When a cage reaches a respective pair of doors, it will be necessary to open the doors, prior to movement. of the respective cage through the doors.

This is achieved by means of the door opening mechanism indicated as 70, which is located above the top wall of the chamber means. The door opening mechanism 70 comprises a pair of cylinders 72, typically being either pneumatic or hydraulic in operation, having rods 73 connected to lever arms 74. Lever arms 74 are in turn connected to door operating shafts 76.

The cylinders 72 are mounted on any suitable fixed means such as legs 78, which also serve to connect the opposite ends of the cylinder to a source of power fluid.

The operation of the doors is controlled by the computer 80 (FIG. 1), which also controls the operation of the beam 42. After the appropriate dwell time, or appropriate number of cycles of movement of the beam 42, which will have been previously programmed, the computer will send a signal to door cylinders 72, causing operation of the cylinders 72 to open the doors.

When the doors are fully open, limit switches 82 will signal the computer 80 that the doors are now open. Computer 80 will then signal cylinder 48 to operate, an incremental movement, or a sequence of several incremental movements. These movements will cause at least one cage to move through the doors 22—22. A pair of limit switches 84 (FIG. 1) mounted on the interior of the facility F at spaced intervals will be contacted by the cage, when it is clear of the doors. The switches 84 will then signal computer 80, and it, in turn, will signal cylinders 72 to close the doors.

The operation of the invention is self evident from the foregoing description. Thus product e.g. meat portions such as for example hams, or the like are loaded onto the shelves of the cages. The cages may then be placed on the rails by any suitable means. This may for example be a conventional fork-lift truck (not shown). Alternatively, some form of hoist means (not shown) may be provided at the upstream end of the chamber for the purpose. The walking beam 42 is then operated, and the upstream doors (not shown) are then opened, and the first cage then transits into the first zone Z1. It is then subjected to whatever processing conditions are established in zone Z1 at the time. During this time, the walking beam 42 may be operated several times so that the cage gradually transits through zone Z1. The walking beam 42 during these repeated operations, may cause a further cage or cages to enter zone Z1. Depending upon the engineering of the system, a plurality of cages may be adapted to be located. simultaneously in zone Z1, while being subjected to progresses incremental movements therethrough.

When the first cage reaches the doors between zone Z1 and zone Z2, then the door operating mechanism 70 will be operated by computer 80 so as to open the doors, and the next increment(s) of movement of the conveyor means will cause that cage to transit into zone Z2.

The same process continues, and causes successive cages to transit through zone Z1 and into zone Z2, and will cause the cages to transmit successively into zone Z3, until the first cage is ready to exit at the downstream end. At this point, that cage can be removed from the rails either for example by another fork-lift truck, or other hoist means (not shown) for further processing. This may involve placing the cage on a further conveyor (not shown) for conveying through other portions of the plant. Alternatively, the product may simply be removed and processed in some other way.

Other cages can be removed successively from the downstream end in the same matter.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A processing chamber apparatus comprising;
  chamber means for processing a plurality of products in batches and defining a floor, a roof, and sides and defining an upstream end through which products may be introduced to said chamber means and a downstream end through which products may be removed from said chamber means;
  product carriers each defining sides, a bottom and a top, each of said carriers being adapted to be transmitted through said chamber means one after the other from said upstream end to said downstream end for carrying products through said chamber means;
  a pair of carrier support rails located on opposite sides of said chamber means, being spaced apart a distance sufficient to receive said product carriers therebetween raised above said floor, upon whcih said carriers may be supported, while standing in and being moved through said chamber means, said support rails defining a predetermined upward incline through said chamber means whereby to carry said product carriers along an upwardly inclined path in said chamber means from a low point adjacent said upstream end ot a high point adjacent said downstream end;
  columns connected to said rails and supporting said rails said columns being located at spaced intervals;
  moveable bearing means mounted on opposite sides of each said carrier above said bottom, oriented for engagement with respective said support rails of said chamber means, for supporting said carriers between said support rails, said moveable bearing means being located spaced apart along said carriers a distance equal to the spacing between said columns, whereby when said carriers are at rest, the weight thereof may be carried directly on said columns, and;
  overhead movement means supported in said chamber means operable to cause intermittent movement of said cariers up said upwardly inclined path defined by said support rails from said upstream end to said downstream end of said chamber means, said carriers dwelling stationary within said chamber means between said intermittent movements with said moveable bearing means registering with said columns when said carriers are stationary;
  moveable buffer means mounted at spaced intervals in said chamber means and being displaceable by said carriers during movement up said upwardly inclined path and being operable to engage said carriers, for halting reverse movement of said carriers down said support rails towards said upstream end when said moveable bearing means register with said columns; and automatic control means for controlling and timing movement of said overhead movement means whereby to procure predetermined dwelling of, and incremental movement of said carriers through said chamber means.

2. A processing chamber apparatus as claimed in claim 1, and further incorporating door means separating at least one portion of said chamber means from another portion thereof, and means for opening said door means, whereby to permit passage of a said carrier therethrough, and means for closing said door means after passage of a said carrier therethrough said doors means being operated automatically by said control means in timed relation to operation of said movement means.

3. A processing chamber apparatus as claimed in claim 1, wherein said movement means incorporates intermittent engagement means, for intermittently engaging said carriers, and moving the same downstream a pre-determined increment, and thereafter releasing same to move in reverse upstream along said support rails until stopped by said buffer means, whereby to procure intermittent step-wise movement thereof through said chamber means, and dwelling of said carriers between said incremental movements, as aforesaid.

4. A processing chamber apparatus as claimed in claim 1, wherein said bearing means on said carriers comprise wheel members rotatably mounted on opposite sides of said carriers, and located to ride on said support means, while supporting said carriers above said floor portion.

5. A process chamber apparatus as claimed in claim 1, and wherein said movement means comprises a generally longitudinal beam moveably supported along the length of said chamber means, and power operated means connected to said beam and operable for moving said beam along said length of said chamber means, and catch means on said beam and abutment means on said carriers, said catch means on said beam being interengageable with said abutment means on said carriers, whereby to cause said incremental movement of said carriers.

6. A processing chamber apparatus as claimed in claim 5, and wherein said catch means comprise arm members pivotally mounted on said beam at spaced intervals therealong, and stop means interengageable with said arm members, whereby said arm members may be swung in one direction, but are stopped from swinging by said stop means in the other direction.

7. A processing chamber apparatus as claimed in claim 1, and wherein said buffer means engageable with said carriers comprise arm means pivotally mounted on fixed support members at spaced intervals along the length of said chamber means, and check means, interengageable with said arm means, whereby said arm means may be swung in one direction, but are checked from swinging by interengagement with said check means in the other direction.

8. A processing chamber apparatus as claimed in claim 1, including door means separating said chamber means into at least two separate chamber zones, said door means being swingable between open and closed positions, and door operating means connected thereto, and to said control means, and being responsive to movement of a saidcarrier, whereby to operate said doors and open the same while said carrier transits therethrough, and thereafter closing said door means once more.

9. A processing chamber apparatus as claimed in claim 5, and wherein said movement means further comprises a fixed bar member fixed longitudinally of said chamber means, and wherein said moveable beam member is suspended therefrom by moveable suspension means located therealong at spaced intervals, whereby said moveable beam member may reciprocate to and fro beneath said fixed bar member.

10. A processing chamber apparatus as claimed in claim 1, and further including process conditioning means associated with said chamber means, for maintaining predetermined processing conditions in at least a portion thereof.

11. A processing chamber apparatus as claimed in claim 10, wherein said chamber means defines at least two separate chamber zones, and including separate process conditioning means for each said zone.

12. A processing chamber apparatus as claimed in claim 8, and including carrier sensing means located in said chamber for sensing the position of a said carrier therein, adjacent to a said pair of door means, said sensing means being connected to said control means, and said control means being adapted thereafter to send a door operating signal to said door operating means to cause the same to open, and said control means thereafter being adapted to send a movement signal to said movement means whereby the same will operate, to transit a said carrier through said doors, and further carrier sensing means in the next portion of said chamber means downstream of said door means, for sensing the presence of said carrier, said further sensing means being connected to said control means and being adapted to send a signal thereto, and said control means thereafter being adapted to send a door operating signal to said operating means whereby to close said doors, after said carrier has transitted therethrough.

* * * * *